United States Patent Office 3,843,371
Patented Oct. 22, 1974

3,843,371
PHOTOGRAPHIC MATERIAL STABILISED AGAINST THE DELETERIOUS EFFECTS OF ULTRAVIOLET RADIATION
Bernhard Piller, Marly, Max Meier, Fribourg, Max Dunnenberger, Frenkendorf, Hans Rudolf Biland, Gelterkinden, and Christian Luthi, Basel, Switzerland, assignors to Ciba-Geigy AG, Basel, Switzerland
No Drawing. Continuation-in-part of application Ser. No. 293,700, Sept. 29, 1972, which is a continuation of application Ser. No. 126,969, Mar. 22, 1971, both now abandoned. This application Mar. 14, 1973, Ser. No. 341,222
Claims priority, application Switzerland, Mar. 23, 1970, 4,336/70
Int. Cl. G03c 1/84
U.S. Cl. 96—84 R      3 Claims

ABSTRACT OF THE DISCLOSURE

The present invention relates to silver halide photographic material or processed material obtained therefrom containing a triazine which is free from sulphonic acid groups and corresponds to the formula

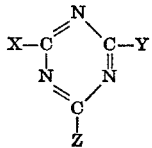

where X is a carbocyclic aromatic group, Y a carbocyclic aromatic group and Z a benzene group directly linked to the triazine ring by a carbon atom of the nucleus, the group carrying, in position 2' with respect to the linkage to the triazine ring, a hydroxyl group, and in position 4' an A—O-group, where A represents a substituted or unsubstituted alkyl group, or a group of the formula

where $p$ is an integer of 1 to 10, $r$ is 1 to 18 and $s$ is 1 or 2.

The photographic material is stabilised by the triazine against the deleterious effect of ultraviolet radiation.

CROSS REFERENCES

This is a continuation-in-part of applicants' copending application Ser. No. 293,700, filed Sept. 29, 1972, now abandoned, which in turn is a continuation of applicants' application Ser. No. 126,969, filed Mar. 22, 1971, now abandoned, the disclosure of which is relied on and incorporated by reference in this application.

According to the present invention there is provided a silver halide photographic material or processed material obtained therefrom which contains, in at least one layer on a support, as a stabiliser against the deleterious effects of ultraviolet radiation, a 2'-hydroxyphenyl-1,3,5-triazine free from sulphonic acid groups and having the formula.

(1)

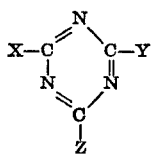

where X is a carbocyclic aromatic group, Y a carbocyclic aromatic or a heterocyclic group, and Z a benzene group linked by a carbon atom in the nucleus directly to the triazine ring and carrying a hydroxyl group in the 2' position with respect to the triazine ring, and an A—O-group in the 4' position, where A is a hydrogen atom, an alkenyl group, or a substituted or unsubstituted alkyl, cycloalkyl, aralkyl or phenyl group, or a group of the formula

where D is an alkyl, alkenyl or a substituted or unsubstituted phenyl group, and where $n$ is 1 or 2.

2'-hydroxyphenyl-1,3,5-triazines of the formula (2)

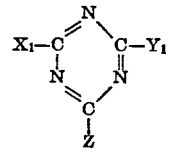

are preferred; in this formula $X_1$ is a mono- or bicyclic, carbocyclic aromatic group, $Y_1$ a mono- or bicyclic, carbocyclic aromatic or a monocyclic, heterocyclic group, and Z has the same significance as above.

The aromatic groups X, $X_1$, Y and $Y_1$ are combined with the triazine ring through a carbon atom in the nucleus, and may have other substituents. They may, for example, be substituted naphthalene, diphenyl and especially benzene groups. The heterocyclic groups Y and $Y_1$ usually have 5- or 6-membered rings, e.g. substituted pyridine, furan or thiophen groups. The groups X, $X_1$, Y and $Y_1$ may have further substituents, e.g. halogen atoms, hydroxyl, alkyl, alkoxy, cycloalkoxy, phenyl or phenoxy groups, or alkyl, alkenyl or phenyl groups combined as esters with the aromatic or heterocyclic rings through a carboxyl or carbamic acid group. Substituents like alkyl, alkoxy, phenyl or phenoxy groups may be further substituted, e.g. with hydroxyl, alkyl, alkoxy, nitro, amino, acylamino, carboxyl, alkoxycarbonyl or aryl groups, or halogen atoms. The X- and Y-groups may therefore also be substituted with aralkyl or aralkoxy groups.

The hydroxybenzene groups Z in formulae (1) and (2) and in formula (3) below may have yet other substituents, preferably at most two, apart from the A—O group, e.g. hydroxyl groups, halogen atoms like fluorine, chlorine or bromine, alkyl or alkoxyl groups with preferably not more than 8 carbon atoms each, phenyl or phenylalkyl groups like benzyl groups. When A is an alkyl, cycloalkyl or phenyl group, it may itself be further substituted with the same groups which are given for the substituents of X and Y.

Suitable 2'-hydroxyphenyl-1,3,5-triazines correspond to the formula (3)

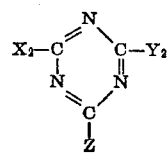

where $X_2$ and $Y_2$ are each a substituted or unsubstituted benzene group combined directly with the triazine ring by a carbon atom in the nucleus, and the significance of Z is as given, or more especially the formula (4)

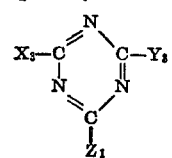

where $X_3$ and $Y_3$ are benzene groups which may or may not contain halogen atoms, hydroxyl groups, groups of the formula (4a)   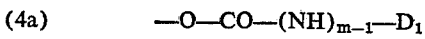

and may be substituted with alkyl, alkenoxy, alkoxy, cycloalkoxy, phenyl or phenoxy groups which may themselves be substituted; the above benzene groups are directly combined with the triazine ring by a carbon atom in the nucleus, $D_1$ is an alkyl, alkenyl, phenyl, alkylphenyl, hydroxyphenyl, alkoxyphenyl or halogenophenyl group, and $m$ is 1 or 2; $Z_1$ is a benzene group directly combined with the triazine ring by a carbon atom in the nucleus, with the benzene group having a hydroxyl group in the 2' position relative to the bond at the triazine ring and an $A_1$—O group in the 4' position, where $A_1$ is a hydrogen atom, an alkenyl group or an alkyl, cycloalkyl or phenyl group which may or may not be substituted with hydroxyl, amino, acylamino, phenoxy, alkoxy, nitro, phenyl, carboxyl or alkoxycarbonyl groups or halogen atoms, or $A_1$ may be a group with the formula (4b)         —CO—(NH)$_{n-1}$—D$_2$ where $n$ is 1 or 2 and $D_2$ has the same significance as $D_1$.

It is of special interest to use 2'-hydroxyphenyl-1,3,5-triazines of the formula (5)
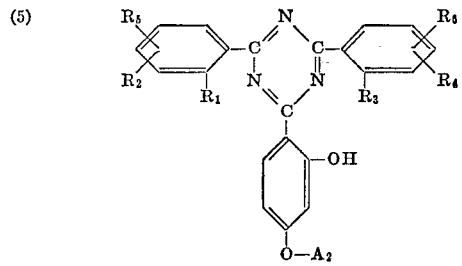

where $R_1$, $R_2$, $R_3$ and $R_4$ signify, independently of each other, a hydrogen atom, a hydroxyl group, a substituted or unsubstituted alkyl group with 1 to 4 carbon atoms or a substituted or unsubstituted alkoxy group with 1 to 8 carbon atoms, and where $R_2$ and $R_4$ each also signify a halogen atom, $R_5$ and $R_6$ each signify a hydrogen or a halogen atom, a hydroxyl group, a substituted or unsubstituted alkyl group with 1 to 4 carbon atoms, a substituted or unsubstituted alkoxy group with 1 to 18 carbon atoms, a substituted or unsubstituted phenyl or phenoxy group, a cycloalkoxy group with 5 or 6 members in the ring, or a group of the formula (5a)         —O—CO—(NH)$_{m-1}$—D$_3$ where $m$ is 1 or 2 and $D_3$ is an alkyl group with 1 to 18 carbon atoms, an alkenyl group with 2 to 4 carbon atoms, a phenyl group, a hydroxyphenyl group, an alkylphenyl group with 1 to 4 carbon atoms in the alkyl part, an alkoxyphenyl group with 1 to 8 carbon atoms in the alkoxy part or a halogenophenyl group; $A_2$ is a hydrogen atom, an alkenyl group with 2 to 4 carbon atoms, a phenyl or alkyl group with 1 to 18 carbon atoms which may or may not be substituted with hydroxyl, alkoxy, amino, acylamino groups like acetylamino, nitro, phenyl, carboxyl (carboxylic acid) or alkoxycarbonyl (carboxylic acid esterified with alkyl groups) groups, or cycloalkyl group with 5 or 6 members in the ring, or a group with the formula (5b)         —CO—(NH)$_{n-1}$—D$_4$ where $n$ is 1 or 2 and $D_4$ signifies the same as $D_3$.

Where groups $R_1$ to $R_4$ are alkyl or alkoxy groups and groups $R_5$ and $R_6$ are alkyl, alkoxy, phenyl or phenoxy groups, they may or may not be substituted, e.g. with hydroxy groups, alkyl or alkoxy groups with a maximum of 4 carbon atoms, epoxy, nitro or phenyl groups, or halogen atoms like chlorine, bromine, iodine or fluorine.

$R_5$ and $R_6$ may therefore also be, for example, an aralkyl group such as a benzyl group, or an epoxy group such as a 2,3-epoxypropoxy group. If $R_5$ or $R_6$ is a cycloalkoxy group, this may be the cyclopentoxy or preferably the cyclohexoxy group.

The alkoxy groups which may be substituents in $A_2$, where they are alkyl or phenyl groups, contain preferably 1 to 8 carbon atoms, while the alkoxy group in any alkoxycarbonyl group which may be a substituent in the same $A_2$ group, contains preferably to to 18 carbon atoms. The statements made about $R_5$ and $R_6$ also apply to the cycloalkyl group $A_2$.

Beneficial results are obtained with 2'-hydroxyphenyl-1,3,5-triazines of the formula (6)
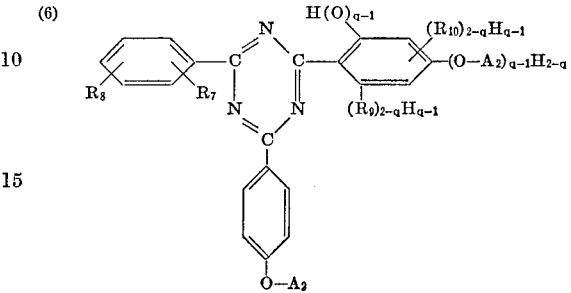

where $R_7$, $R_8$, $R_9$ and $R_{10}$ each signify a hydrogen atom, a halogen atom, an alkyl group with 1 to 4 carbon atoms or an alkoxy group with 1 to 8 carbon atoms, $q$ is 1 or 2 and $A_2$ has the given significance, the best results being specifically obtained with 2'-hydroxyphenyl-1,3,5-triazines of the formula (7)
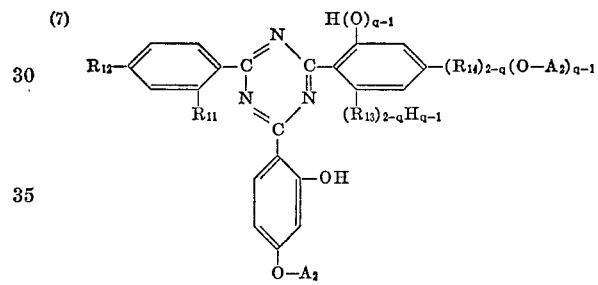

where $R_{11}$ and $R_{13}$ are each a hydrogen atom or an alkyl group with 1 to 4 carbon atoms, $R_{12}$ and $R_{14}$ are each a hydrogen or chlorine atom or an alkyl group with 1 to 4 carbon atoms, $q$ is 1 or 2 and $A_2$ has the stated significance.

If groups $R_7$ to $R_{10}$ are halogen atoms, they are iodine, bromine, fluorine or preferably chlorine atoms. If the groups $R_7$ to $R_{14}$ represent alkyl groups, they are, for instance, methyl, isopropyl, isobutyl or tertiary butyl groups. If groups $R_7$ to $R_{10}$ are alkoxy groups, they are, for example, ethoxy, butoxy or octoxy groups.

The use of 2'-hydroxyphenyl-1,3,5-triazines of the formula (8)
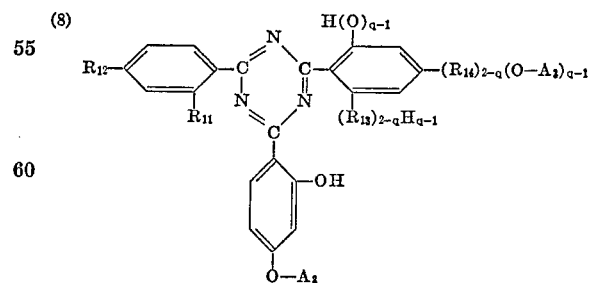

has proved particularly advantageous; here $A_3$ is a hydrogen atom, an alkyl group with 1 to 18 carbon atoms which may or may not be substituted with hydroxyl, alkoxy, nitro, amino, acetylamino, phenyl, carboxyl or alkoxycarbonyl groups, with the alkoxy groups containing 1 to 18 carbon atoms, or $A_3$ may be a group of the formula (5b)         —CO—(NH)$_{n-1}$—D$_4$ and $n$, $D_4$, $R_{11}$, $R_{12}$, $R_{13}$, $R_{14}$ and $q$ have the stated significance.

2'-hydroxyphenyl-1,3,5-triazines with the formula (9)
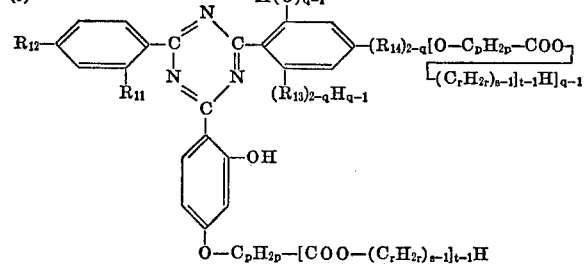

claim a particular interest where $p$ and $r$ are each integers between 1 and 18, and $s$ and $t$ are each 1 or 2, and $R_{11}$, $R_{12}$, $R_{13}$, $R_{14}$ and $q$ have the stated significance. Among these, the triazines with the formulae

(10)
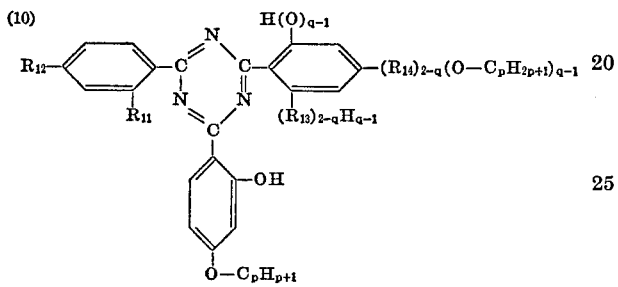

(11)
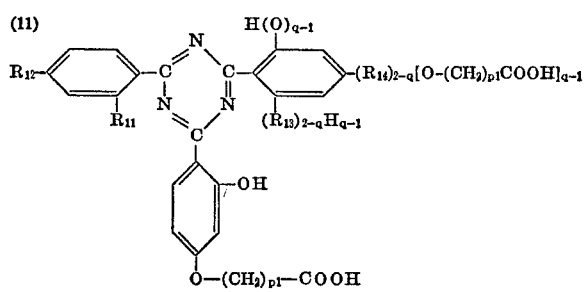

and

(12)
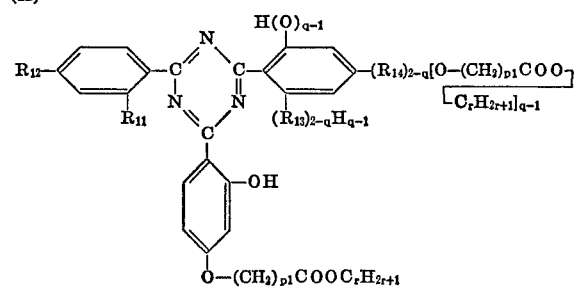

are preferred, where $R_{11}$, $R_{12}$, $R_{13}$, $R_{14}$, $q$ and $r$ have the stated significance, and $P_1$ is an integer between 1 and 10.

In formulae (9) and (12) $r$ is preferably an integer between 1 and 8.

Finally, triazines with the formula

(13)
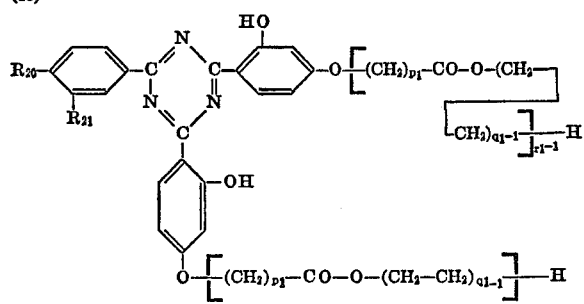

where $R_{20}$ and $R_{21}$ are each a hydrogen or a chlorine atom, $P_1$ is an integer between 1 and 10 and $q_1$ and $r_1$ are each 1 or 2, call for special attention.

The 2'-hydroxyphenyl-1,3,5-triazines of the invention are known and can be prepared by methods which are in principle known.

Hydroxyphenyl-1,3,5-triazines are known from French Patent No. 1,379,138 as ultraviolet absorbers in organic materials sensitive to ultraviolet light, and they have the general formula

(14)
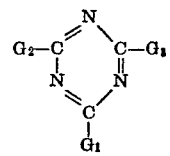

where $G_1$ is a hydroxybenzene group directly linked to the triazine ring by a carbon atom of the nucleus, this group having a hydroxyl group in position 2' with respect to the triazine ring bond and an E—O group in position 4', where E represents an alkenyl or substituted alkyl group and $G_2$ and $G_3$ are each benzene groups directly linked to the triazine ring via a carbon atom of the nucleus.

Hydroxyphenyl-1,3,5-triazines are known as ultraviolet protectors for organic materials from French Pat. No. 1,405,559; they correspond to the general formula

(15)
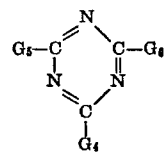

where $G_4$ is a hydroxybenzene group containing a hydroxyl group in position 2' with respect to the bond at the triazine ring and in position 4' a radical of the formula (15a)         —O—CO—(NH)$_{x-1}$—E$_1$ where $E_1$ is an organic radical and $x$ is 1 or 2, $G_5$ is a benzene group and $G_6$ a halogen atom or a benzene group.

French Patent 1,379,138 discloses hydroxyphenyl-1,3,5-triazines for stabilising organic materials, corresponding to the formula

(16)
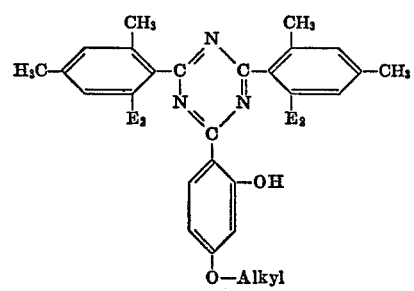

where $E_2$ may be a hydrogen atom or a methyl group.

French Pat. 1,387,435 also discloses hydroxyaryl-1,3,5-triazines for protecting organic against ultraviolet radiation; they correspond to the formula (17)

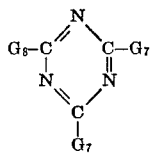

where $G_7$ is a hydroxybenzene group with a hydroxyl group in the position next to the bond at the triazine ring, and $G_8$ a thiophen or furan group which is linked by one of its carbon atoms of the nucleus to the triazine ring.

Particularly suitable compounds for use according to the invention are summarised in the following Table I; they correspond to the general formula:

(100)

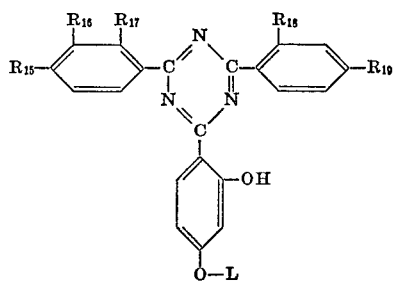

where the significance of $R_{15}$ to $R_{19}$ and L will be found in the appropriate columns.

may have been partly or completely processed. Preferably unexposed or image-wise exposed and fixed colour photographic materials are stabilised against ultraviolet radiation. They may be colour photographic materials for the dye transfer process, but the invention is of particular value in the stabilisation of colour photographic materials designed for processing by the chromogenic and silver-dye bleaching processes.

The compounds, or mixtures of them, to be used according to the invention may be included in any form in the layers containing dyestuffs or their constituents, and also in coloured or colourless, intermediate, back or surface layers of the photographic material to be protected, and these layers may also contain other constituents.

The compounds to be used according to the invention may be incorporated or applied either during the manufacture of the photographic material, e.g. by inclusion in the required emulsion layers, or before, during or after photographic processing, e.g. by application as such, or by application with the aid of a binder, e.g. by overspraying with a protective coating, or by diffusing it into the film from a solution, suspension or emulsion. More specifically, the following methods of incorporating compounds of formula (1) are possible;

1. Incorporation in the film forming binder, e.g. in gelatin or in other, usual, film forming media such as photographhic lacquers which may, for example, consist of ethyl or acetyl cellulose.
   1.1 Molecularly dispersed solution in the binder.
   1.2 In the form of associated molecules dispersed in the binder.

TABLE I

| Formula number | $R_{15}$ | $R_{16}$ | $R_{17}$ | $R_{18}$ | $R_{19}$ | L | Melting point °C. | Absorption maximum in dimethyl formamide in [nm.] | Absorption maximum in water at pH 14 in [nm.] |
|---|---|---|---|---|---|---|---|---|---|
| 301 | H | H | H | OH | OL | $CH_2COOH$ | 305 | | **300+352 |
| 302 | H | H | H | OH | OL | $(CH_2)_5COOH$ | 122 | | **301+351 |
| 303 | H | H | H | OH | OL | $(CH_2)_{10}COOH$ | 134 | | **299+350 |
| 304 | $CH_3$ | H | $CH_3$ | $CH_3$ | $CH_3$ | $CH_2COOH$ | 210 | | **295+335 |
| 305 | Cl | H | H | OH | OL | $(CH_2)_5COOH$ | 175 | | **303+360 |
| 306 | Cl | Cl | H | OH | OL | $(CH_2)_5COOH$ | 195 | | **307+360 |
| 307 | Cl | H | H | OH | OL | $(CH_2)_{10}COOH$ | 105 | | **302+350 |
| 308 | Cl | Cl | H | OH | OL | $CH_2COOH$ | 225 | | **301+350 |
| 401 | H | H | H | OH | OL | $CH_2COOC_2H_5$ | 170 | 297+358 | |
| 402 | H | H | H | OH | OL | $CH_2COOC(CH_3)_3$ | 177 | 298+357 | |
| 403 | H | H | H | OH | OL | $CH_2COO(CH_2)_5CH_3$ | 105 | 297+356 | |
| 404 | H | H | H | OH | OL | $CH_2COOCH_2CH\begin{matrix}(CH_2)_3CH_3\\ C_2H_5\end{matrix}$ | 91 | 298+361 | |
| 405 | H | H | H | OH | OL | $CH_2$—⟨phenyl⟩ | 186 | 297+362 | |
| 406 | H | H | H | OH | OL | $(CH_2)_5COOC_2H_5$ | 104 | 304+359 | |
| 407 | H | H | H | OH | OL | $(CH_2)_5COOCH_2CH(CH_3)_2$ | 91 | 303+357 | |
| 408 | H | H | H | OH | OL | $(CH_2)_{10}COOC_2H_5$ | 108 | 305+362 | |
| 409 | $CH_3$ | H | $CH_3$ | $CH_3$ | $CH_3$ | $CH_2COOC_2H_5$ | 118 | 290+333 | |
| 410 | Cl | H | H | OH | OL | $(CH_2)_5COOC_2H_5$ | 57 | 305+374 | |
| 411 | Cl | Cl | H | OH | OL | $(CH_2)_5COOC_2H_5$ | 91 | 306+354 | |
| 412 | H | H | H | OH | OL | $(CH_2)_5COOCH(CH_3)_2$ | 91 | 303+363 | |
| 413 | H | H | H | OH | OL | $(CH_2)_5COO(CH_2)_3CH_3$ | 82 | 303+363 | |
| 414 | H | H | H | OH | OL | $(CH_2)_{10}COOCH(CH_3)_2$ | 86 | 301+357 | |
| 415 | Cl | H | H | OH | OL | $(CH_2)_{10}COOC_2H_5$ | 66 | 298+353 | |
| 416 | Cl | Cl | H | OH | OL | $CH_2COOC_2H_5$ | 167 | 297+340 | |
| 417 | H | H | H | OH | OL | $CH_2COOCH_3$ | 177 | 298+349 | |
| 418 | H | H | H | OH | OL | $CH_2COO(CH_2)_{17}CH_3$ | 101 | 298+350 | |

The invention is of particular importance in relation to colour photographic material.

The preferred colour photographic material which, according to the invention, is stabilised against ultraviolet radiation, may be unexposed, or image-wise exposed and 1.3 Finely dispersed in the binder. This may be done by the usual dispersing methods such as controlled precipitation from the liquid or dissolved state, grinding or emulsifying a solution of the components in a liquid which is not miscible with the binder or binder solution, followed by the removal of the liquid by washing or evaporation. This involves the utilisation of known techniques for the production of dispersion, e.g. the use of dispersants, protective colloids, dispersing agitators, a continuous flow chamber, etc.

1.4 Finely emulsified as a liquid in the binder.

2. Incorporation in an auxiliary substrate in a manner corresponding to 1.1 to 1.4, the substrate being subsequently dissolved, dispersed, copolymerised or reactively crosslinked in some form.

The following substrates may be used:

Water soluble polymers based on acrylic acid and vinyl pyrrolidone, polyvinyl alcohols, gelatin derivatives, e.g. gelatin modified by reactive crosslinking, for example with triazine derivatives, starch, polyamides, polyacrylonitrile; high boiling solvents like dicarboxylic esters such as diethyl lauramide and tricresyl phosphate.

3. Incorporation in the support of the layer e.g. in cellulose triacetate, polyesters, polycarbonate, preferably as a molecularly dispersed solution.

The compounds according to the invention are marked by excellent solubility in water (compounds of formula (11)) or dibutyl phthalate (compounds of formulae (10) and (12)), and by suitable spectral absorption, high light fastness and particularly by giving outstanding protection against ultraviolet radiation, by good diffusion resistance and useful rheological properties in mixtures with gelatin. The good solubility in water is demonstrated by the following data:

TABLE II

| Formula No.: | Solubility in water, g./100 g. $H_2O$ |
|---|---|
| 301 | >10 |
| 302 | >10 |
| 303 | > 5 |
| 305 | >15 |
| 306 | > 3 |
| 307 | > 5 |
| 308 | > 2 |

This product gives also an inadmissibly high viscosity of the casting solution.

| Reference compounds | Solubility in water, g./100 g. $H_2O$ |
|---|---|
| Compound 9 of U.S. Pat. 3,244,708. | <0.25 |
| French Pat. 1,379,138, Example 1. | <0.25 |

The good solubility in dibutyl phthalate is shown in Table III:

TABLE III

| Formula No.: | Solubility in DBP, g./100 g. DBP.* |
|---|---|
| 406 | >100 |
| 407 | 25 |
| 410 | >100 |
| 411 | >100 |
| 412 | 40 |
| 414 | 25 |
| 415 | 25 |

*Dibutyl phthalate.

| Reference compounds | Solubility in DBP, g./100 g. DBP |
|---|---|
| French Pat. 1,379,138, Example 1. | 5 |
| French Pat. 1,379,138, Example 4. | 10 |

| Reference compounds | Solubility in DBP, g./100 g. DBP |
|---|---|
| 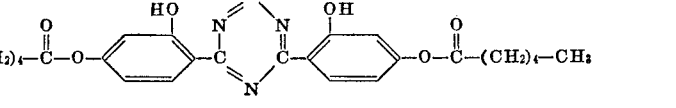<br>Compound 30 of U.S. Pat. 3,249,608. | <10 |
| <br>Compound 31 of U.S. Pat. 3,249,608. | <10 |
| <br>Compound 32 of U.S. Pat. 3,249,608. | <10 |
| 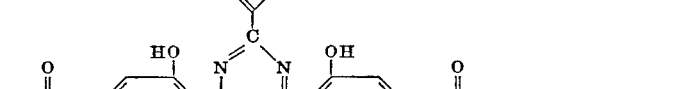<br>Compound 33 of U.S. Pat. 3,249,608. | <10 |
| 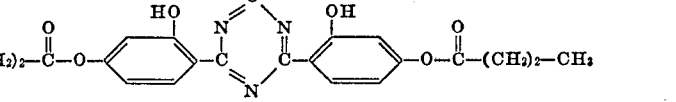<br>Compound 37 of U.S. Pat. 3,249,608. | <10 |
| 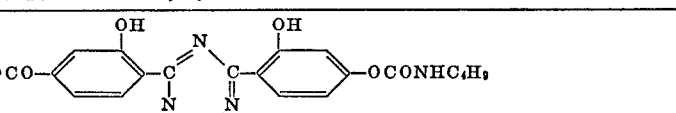<br>Compound 49 of U.S. Pat. 3,249,608. | <10 |

The following examples will serve to illustrate the invention:

EXAMPLE 1

100 g. of a compound of formula (406) is dissolved, on a water bath in 100 g. dibutyl phthalate. This solution is dispersed with a colloid mill in a mixture of 200 g. of an 8% aqueous solution of sodium alkylnaphthalene sulphonate and 1600 g. of a 12.5% gelatin solution. The dispersion is diluted and cast on a silver dye bleach material as described in the example of U.S. Pat. 3,454,402 in such a way that, after drying, the resultant UV-protective film has an optical density of 1.5 for light of 350 nm. wavelength.

After exposition through a diapositive the material is treated for six minutes with a commercial p-methylaminophenol sulphate hydroquinone developer and immersed for four minutes in a stopping-and-fixing bath with the following composition:

|  | G. |
|---|---|
| Ammonium thiosulphate | 200 |
| Sodium sulphite | 15 |
| Sodium acetate trihydrate | 25 |
| Glacial acetic acid | 13 |
| Water to make 1000 g. | |

After washing the material with water for two minutes, it is treated for six minutes with a solution of the following composition:

| | |
|---|---|
| 37% hydrochloric acid | ml.. 70 |
| Potassium bromide | g.. 50 |
| Thiourea | g.. 80 |
| 2-amino-3-hydroxyphenazine | mg.. 5 |
| Water to make 1000 ml. | |

Next the material is rinsed for two minutes in water and then immersed in a bleach bath of the following composition:

| | |
|---|---|
| Potassium ferricyanide | g.. 75 |
| Potassium bromide | g.. 15 |
| Monosodium phosphate monohydrate | g.. 10 |
| Sodium acetate trihydrate | g.. 5 |
| Glacial acetic acid | ml.. 10 |
| Water to make 1000 ml. | |

After two minutes the material is washed with water for two minutes and again treated for four minutes with the stopping-and-fixing bath described above. Then the material is washed and dried.

After the material has been subjected to the type of photographic processing just described a picture of the original diapositive is obtained and the optical density of the UV-protective layer still remains at 1.5 for light of 350 nm. wavelength. A sample of this material is illuminated for 144 hours with a Xenon lamp. The material shows a significant improvement in lightfastness compared to a sample without the protective layer.

Similar results are obtained when one of the other compounds of formulae (401) to (416), (417) or (418) listed in Table I is used.

EXAMPLE 2

Pipette 3.3 ml. 6% aqueous gelatine solution, 2.0 ml. 1% aqueous solution of a hardener of the formula (501)

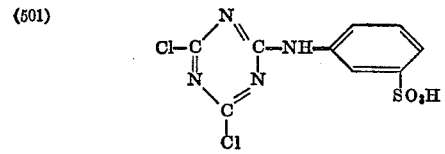

and 0.6 ml. 1% aqueous solution of the compound of formula (303) into a test tube and make up to 10.0 ml. with deionised water. This solution is thoroughly agitated and kept for five minutes in a waterbath at 40° C. The warm casting solution at 40° C. is cast onto a 13 cm. x 18 cm. glass plate, on which a dye containing emulsion layer following the Example No. 3 of U.S. Pat. No. 3,655,388 has been coated before. After solidifying at 10° C., the plate is dried in a cabinet where air circulates at 32° C. The optical density of the UV filter layer is 1.0 for light of 350 nm. wavelength.

A strip of this plate, cut to 3.5 cm. x 18 cm., in exposed to 500 lux/cm.² for 24 seconds under a step wedge through a blue filter Kodak 2b+49.

Thereafter the strip is treated and described in Example 1. A brilliant purple wedge is obtained, and the optical density of the UV protective layer is unaffected. The lightfastness of this wedge is considerably higher than that obtained in the Example No. 3 of U.S. Pat. No. 3,655,388.

Similar results are obtained, when one of the other compounds of formulae (301), (302) or (304) to (308) listed in Table I. If the compound of formula No. (27) or (28) of U.S. Pat. No. 3,444,164 is used instead of the compound of formula (303), a loss in optical density of the UV absorber of 16% resp. 18% for light of 350 nm. wavelength is observed.

EXAMPLE 3

Mix 6.6 ml. of an aqueous gelatine solution adjusted to pH 9.0 with 1.2 ml. of a 1.0% aqueous solution of the product of formula (301) at pH 10.0 and expose for thirty minutes to ultrasonic waves with ultrasonic equipment with an output of 50 watt. Then the mix is adjusted dropwise with 1 N hydrochloric acid to pH 5.5 under 50 watt ultrasonic treatment, after which treatment with ultrasonic waves at 50 watt is continued for another 10 minutes. Add 1.0 ml. 1% aqueous solution of the hardener of formula (501) cast the mix as described in Example 2 and dry it. The optical density of the UV protective layer will be 1.5 for light of 350 nm. wavelength. After treatment according to Example 1 a brilliant purple wedge is obtained, and the optical density of the protective layer is unaffected. The lightfastness of this wedge is considerably higher than that obtained in the Example 3 of U.S. Pat. No. 3,655,388.

EXAMPLE 4

6 mg. of the compound of formula (427) is mixed with 6.6 ml. 6% aqueous gelatine solution while being treated ultrasonically. Add 1.0 ml. 1% aqueous solution of the hardener of formula (501) and make up to 10.0 ml. with deionised water. The mixture is cast and dried as in Example 2. This gives an optical density of 1.0 for light with a wavelength of 350 nm. for the UV protective layer.

After treatment according to Example 1 similar results as in Example 2 or 3 are obtained.

EXAMPLE 5

A green-sensitive silver bromide emulsion containing the magenta dyestuff with the formula (502)

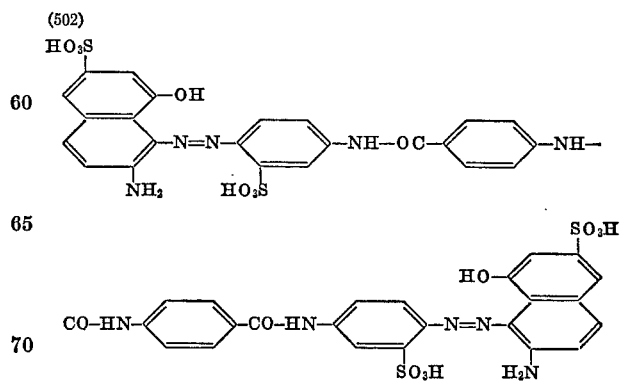

is cast on a transparent support.

Strips are cut of this light-sensitive material and coated with a dispersion of a compound in Table I for use according to the invention as described in Examples 1, 2 or 3. A gelatine solution is applied to a reference strip.

After passing through the photographic processing procedure described in Example 1, all strips have the same excitation purity when measured in green light.

The strips are illuminated for 150 hours with a xenon lamp. A comparison of the optical densities before and after the illumination yields a measure of the improvement of the lightfastness produced by the applied protective layer. The results are summarised in Table IV below.

In place of the compounds listed in Table IV, it is also possible to use one of the other compounds listed in Table I.

Similar results are also obtained with other dyestuffs commonly used in bleaching, dye transfer or chromogenic photography.

TABLE IV

| Protective layer as in Example number | With compound of formula number | $D_{max}$ of the dyestuff Before illumination | $D_{max}$ of the dyestuff After illumination | $-D_{max}$ (decrease of $D_{max}$) in. | Improvement of the lightfastness of percent |
|---|---|---|---|---|---|
| (¹) | (¹) | 1.00 | 0.82 | 18 | (¹) |
| 1 | 406 | 1.00 | 0.92 | 8 | 56 |
| 1 | 407 | 1.00 | 0.94 | 6 | 67 |
| 1 | 412 | 1.00 | 0.96 | 4 | 78 |
| 1 | 413 | 1.00 | 0.96 | 4 | 78 |
| 2 | 301 | 1.00 | 0.93 | 7 | 61 |
| 2 | 302 | 1.00 | 0.89 | 11 | 39 |
| 2 | 303 | 1.00 | 0.96 | 4 | 78 |
| 2 | 304 | 1.00 | 0.89 | 11 | 39 |
| 2 | 305 | 1.00 | 0.95 | 5 | 72 |
| 2 | 306 | 1.00 | 0.97 | 3 | 83 |
| 2 | 307 | 1.00 | 0.95 | 5 | 72 |
| 2 | 308 | 1.00 | 0.90 | 10 | 44 |

¹ Reference sample (gelatin layer without stabiliser).
² $100 \left[ 1 - \frac{D_{max}\%}{18\%} \right]$

EXAMPLE 6

Dissolve 0.15 g. of the compound of formula (406) in 100 ml. of a commercial nitrocellulose lacquer suitable for photographic material to be viewed directly or by transmitted light, e.g. "CIBA Photolack." This mixture is applied in such a way to a supported, hardened gelatine layer containing dyestuff of formula (502) at a maximum density of 1.00, that the protective layer has an optical density 1.0 at 350 nm. If the "CIBA Photolack" is used, the thickness of the layer is about 20 μm.

After 150 hours illumination with a xenon lamp, the protection calculated according to Example 5 is 51% by reference to a coating without stabiliser.

Similar results are obtained with one of the other compounds of formulae (401) to (405) or (407) to (418) listed in Table I.

EXAMPLE 7

A silver dye bleach photographic image containing the dyestuff of formula (502) and obtained by the procedure described in Example 3 of U.S. Pat. No. 3,655,388 is immersed in a 0.25% aqueous solution of compound (308) until the optical density of the stabiliser diffusing into the gelatine is 1.0 at 350 nm.

After drying it is illuminated with a xenon lamp for 150 hours. The protection calculated according to Example 5 in 48%, for an optical density of 1.0 of the magenta dyestuff, by reference to a sample without stabiliser.

Similar results are obtained with compounds of formulae (301) to (307) of Table I.

EXAMPLE 8

Ektachrome daylight transparency material exposed to white light and developed in the usual manner is given a protective layer (test specimen) made as in Example 2 and containing the compound of formula (307). A similar specimen not containing compound (307) is used as the reference (blank specimen).

Both samples are illuminated for 144 hours with a xenon lamp. The filter densities for red, green and blue light (R, G and B) are measured with a Gretag D 33 Densitometer before and after the illumination. The results are summarised in Table V.

TABLE IV

Filter density:
  Before the illumination:
    Test specimen:
      B _____ 1.57
      G _____ 1.63
      R _____ 1.39
    Blank specimen:
      B _____ 1.61
      G _____ 1.65
      R _____ 1.42
  After the illumination:
    Test specimen:
      B _____ 1.01
      G _____ 1.45
      R _____ 1.22
    Blank specimen:
      B _____ 0.81
      G _____ 1.42
      R _____ 1.22

Improvement of the lightfastness in percent by the compound of formula (202) according to the formula:

$$100 \left[ 1 - \frac{\Delta D \text{ in percent of the test specimen}}{\Delta D \text{ in percent of the blank specimen}} \right]$$

B _____ 28
G _____ 21
R _____ 13

We claim:
1. Silver halide photographic material or processed material obtained therefrom which comprises, in at least one layer on a support, as a stabiliser against the deleterious effects of ultraviolet radiation, a 2'-hydroxy-2,4,6-triphenyl-1,3,5-triazine free from sulphonic acid groups and having the formula

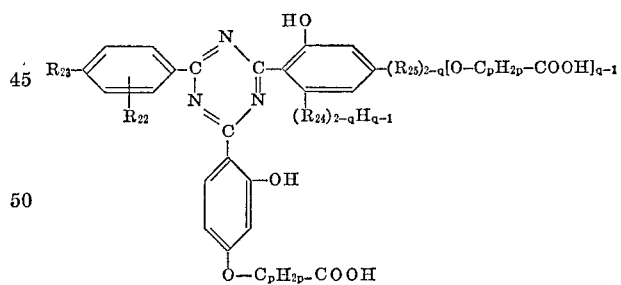

where $p$ is an integer between 1 and 10, $q$ is 1 or 2, $R_{22}$ and $R_{23}$ are each a hydrogen or chlorine atom or an alkyl group with 1 to 4 carbon atoms, and $R_{24}$ and $R_{25}$ are each a hydrogen atom or an alkyl group with 1 to 4 carbon atoms.

2. Material according to claim 1, wherein the 2'-hydroxy-2,4,6-triphenyl-1,3,5-triazine has the formula

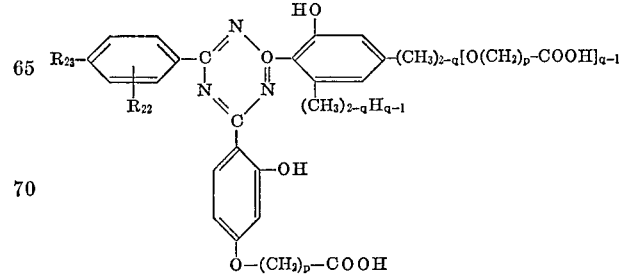

where $R_{22}$ and $R_{23}$ are each a hydrogen or chlorine atom or a methyl group and $p$ and $q$ have the same significance as in claim 1.

3. Material according to claim 2 wherein $R_{22}$ and $R_{23}$ are each a hydrogen or a chlorine atom and $q$ is 2.

References Cited

UNITED STATES PATENTS

| | | | |
|---|---|---|---|
| 3,244,708 | 4/1966 | Duennenberger et al. | 252—300 |
| 3,211,729 | 10/1965 | Siegrist et al. | 96—84 |
| 3,118,887 | 1/1964 | Hardy et al. | 252—300 |
| 3,249,608 | 5/1966 | Biland et al. | 252—300 |
| 3,365,293 | 1/1968 | Haefeli et al. | 96—84 |

RONALD H. SMITH, Primary Examiner

U.S. Cl. X.R.

252—300